UNITED STATES PATENT OFFICE.

HAROLD HIBBERT, OF PITTSBURGH, PENNSYLVANIA.

EXPLOSIVE AND METHOD OF PRODUCING SAME.

1,213,369. Specification of Letters Patent. Patented Jan. 23, 1917.

No Drawing. Application filed January 10, 1916. Serial No. 71,217.

*To all whom it may concern:*

Be it known that I, HAROLD HIBBERT, a subject of Great Britain, residing in Pittsburgh, Allegheny county, State of Pennsylvania, have invented certain new and useful Improvements in Explosives and Methods of Producing Same; and I do hereby declare the following to be a full, clear, and exact description of the invention, such as will enable others skilled in the art to which it appertains to make and use the same.

This invention relates to the production of explosives and of explosive compositions from polyglycols or mixture of polyglycols, either alone or in admixture with glycols, glycerin, etc., by nitration.

The present invention is based upon the discovery that explosive compositions of valuable properties and characteristics can be obtained by the nitration of polyglycols. The resulting nitrated-polyglycol explosives are characterized by a low freezing point, and by viscosities which adapt them particularly for certain purposes, such as compounding with other explosive ingredients.

When the individual glycols, or mixtures of glycols, are heated to relatively high temperatures, for considerable periods of time, or are treated with a suitable condensing agent or catalytic, they combine, with elimination of water, to form the diglycols, triglycols, etc., which are herein referred to, generically, as polyglycols. Where a single glycol is condensed the resulting polyglycol will, of course, be formed from two or more molecules of this glycol by the elimination of water. Where a mixture of glycols is condensed, the resulting polyglycol mixture may be made up of the polyglycols from the individual glycols, or of condensation products of different glycols with each other. Usually, only a part of the glycol or glycols will be condensed to polyglycols, and the resulting product will accordingly be made up of a mixture of glycols with polyglycols, in which mixture the polyglycols may be present to the extent of only a few per cent., or of a much larger per cent. Where the individual polyglycols are desired, they may be isolated from admixture with the glycols and other polyglycols, or they may be produced by other suitable means.

The particular method of producing the glycols and the polyglycols forms no part of the present invention, and accordingly any suitable method may be utilized for their production.

In my application, Serial No. 9774, filed February 23, 1915, I have described the production of a mixture of ethylene, propylene and butylene glycols from oil gas, by subjecting the oil gas to a cracking operation, chlorinating the resulting unsaturated derivatives and converting the chlorinated compounds into the glycols by heating with an aqueous solution of sodium carbonate. This mixture of glycols, when condensed and converted in part into polyglycols, forms a particularly valuable mixture of polyglycols with glycols for use in producing the novel nitrated-polyglycol explosive of the present invention.

Another valuable source of the individual ethylene glycol is ordinary grain or ethyl alcohol, which can be converted into ethylene, thence into the chlorine derivative, and finally into the ethylene glycol. The ethylene glycol can then be condensed to produce a mixture thereof with the polyglycol or glycols by heating or by the action of a condensing agent or a catalytic.

The polyglycol or mixture of polyglycols, or the mixture of one or more polyglycols with the uncondensed glycol or glycols, is subjected to the action of a mixture of concentrated sulfuric and nitric acids, such as are used for the manufacture of nitroglycerin, and there is produced a mixture of nitrated-polyglycols or of nitrated-polyglycols with nitrated-glycols, which represents a very stable product and one which forms a valuable substitute for nitroglycerin. These nitrated-polyglycol explosives, however, have the advantage of low volatilization and of low freezing point. The novel nitrated-polyglycol explosives of the present invention not only form valuable substitutes for nitroglycerin but they can be used as a partial substitute for nitroglycerin and mixed therewith in varying proportions. In order to produce such a mixture of nitroglycerin with the nitrated-polyglycols the glycerin may, with advantage, be mixed with the polyglycols before nitration, and nitrated simultaneously therewith. Inasmuch as the nitration process of the polyglycols has proven to be similar to, or substantially the same as, that of nitrating glycerin, the nitrating process proceeds smoothly to give the desired nitrated mixture.

The nitrated-polyglycol explosive of the present invention, whether made from the individual polyglycols or mixtures of one or more thereof with glycols or glycerin or other explosive constituents, can be used in the explosive art in various ways. They may thus be absorbed by porous materials in much the same manner that nitroglycerin is absorbed. One particularly advantageous application of the nitrated-polyglycol explosive is its utilization as a solvent of nitro-cellulose. Nitro-cellulose dissolves in the liquid nitrated-polyglycol mixtures to form a colloid of a stable nature and of materially improved properties as compared with the product obtained by dissolving nitro-cellulose in nitroglycerin.

The following specific example further illustrates the invention: A mixture of one part of glycols and polyglycols, containing about 20 to 30% of polyglycols, is nitrated by adding it slowly to a mixture of 8 times its weight of a nitrating acid of the following composition:

$H_2SO_4$ ---------------- 58.63%
$HNO_3$ ---------------- 27.10%
$H_2O$ ---------------- 14.27% previously cooled to around $+5°$ C. After the addition of the glycol-polyglycol mixture has been completed it is stirred for another 10 minutes in order to complete the nitration and then allowed to stand for a short period in order to bring about a separation of the nitrated product from the nitrating acid. After washing the nitrated product, first with water, then with dilute bi-carbonate solution, and again with pure water, the same may then be utilized directly for the manufacture of explosives by incorporating with sodium or potassium nitrate and wood pulp in the usual manner. If desired to use this mixture in connection with the manufacture of nitro-cellulose powders this can with advantage be done by incorporating 6 parts of this nitrated product with about 9 parts nitrocellulose, adding thereto about five one-hundredths of a per cent. of diphenylamin and incorporating the mixture in the usual gelatininzing machine. The gelatinized product may then be passed through a suitable die or transformed into any desired shape suitable to the purpose in view.

The nitrated-polyglycol explosives can of course be compounded with other explosive ingredients or constituents including inorganic oxidizing agents where these are of importance in the explosive composition. Accordingly, I refer to the nitrated-polyglycol explosive, generically, as including not only the isolated nitrated-polyglycols and their mixtures with each other and with nitrated glycols and nitro-glycerins, but also their mixtures with other suitable explosive constituents with which they may be combined in the production of commercial explosives.

I claim:—

1. An explosive comprising a nitrated polyglycol, said explosive being a stable product of a relatively non-volatile nature and of low freezing point; substantially as described.

2. An explosive comprising a mixture of nitrated polyglycols, said explosive being a stable product of a relatively non-volatile nature and of low freezing point; substantially as described.

3. An explosive comprising a mixture of nitrated polyglycols with intrated glycols, said explosive being a stable product of a relatively non-volatile nature and of low freezing point; substantially as described.

4. An explosive comprising a nitrated mixture of ethylene, propylene and butylene glycols and nitrated polyglycols, said explosive being a stable product of a relatively non-volatile nature and of low freezing point; substantially as described.

5. An explosive comprising a solution of nitro-cellulose in a nitrated polyglycol, said explosive being a stable colloid of relatively non-volatile nature and of low freezing point; substantially as described.

6. An explosive comprising a solution of nitro-cellulose in a mixture of nitrated polyglycols, said explosive being a stable colloid of relatively non-volatile nature and of low freezing point; substantially as described.

7. An explosive comprising a solution of nitro-cellulose in a mixture of nitrated polyglycols with nitrated glycols, said explosive being a stable colloid of relatively non-volatile nature and of low freezing point; substantially as described.

8. An explosive comprising a solution of nitro-cellulose in a nitrated mixture of ethylene, propylene and butylene glycols and nitrated polyglycols, said explosive being a stable product of a relatively non-volatile nature and of low freezing point; substantially as described.

9. An explosive comprising a nitrated polyglycol in admixture with nitro-glycerin, said explosive being a stable product of a relatively non-volatile nature and of low freezing point; substantially as described.

10. An explosive comprising a nitrated mixture of ethylene, propylene and butylene glycols with nitrated polyglycols and nitro-glycerin, said explosive being a stable product of a relatively non-volatile nature and of low freezing point; substantially as described.

11. An explosive comprising a solution of nitro-cellulose in a mixture of nitrated polyglycols and nitro-glycerin, said explosive being a stable colloid of relatively non-volatile nature and of low freezing point; substantially as described.

12. An explosive comprising a solution of nitro-cellulose in a nitrated mixture of ethylene, propylene and butylene glycols with nitrated polyglycols and nitro-glycerin, said explosive being a stable product of a relatively non-volatile nature and of low freezing point; substantially as described.

In testimony whereof I affix my signature.

HAROLD HIBBERT.